United States Patent
Nakamura et al.

(10) Patent No.: US 7,613,397 B2
(45) Date of Patent: Nov. 3, 2009

(54) WAVELENGTH DIVISION MULTIPLEXING OPTICAL TRANSMISSION SYSTEM AND WAVELENGTH DISPERSION COMPENSATION UNIT

(75) Inventors: Kentaro Nakamura, Kawasaki (JP); Hiroki Ooi, Kawasaki (JP); George Ishikawa, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 568 days.

(21) Appl. No.: 10/914,625

(22) Filed: Aug. 10, 2004

(65) Prior Publication Data

US 2005/0213987 A1     Sep. 29, 2005

(30) Foreign Application Priority Data

Mar. 26, 2004  (JP) .............................. 2004-091229

(51) Int. Cl.
*H04J 14/02*  (2006.01)
*H04B 10/18*  (2006.01)

(52) U.S. Cl. ...................................... 398/81
(58) Field of Classification Search ............ 398/81
See application file for complete search history.

(56) References Cited

U.S. PATENT DOCUMENTS

| | | | |
|---|---|---|---|
| 5,602,666 A | 2/1997 | Ishikawa et al. | |
| 5,612,807 A | 3/1997 | Ishikawa et al. | |
| 5,636,046 A | 6/1997 | Ishikawa et al. | |
| 5,696,614 A | 12/1997 | Ishikawa et al. | |
| 6,243,176 B1 | 6/2001 | Ishikawa et al. | |
| 6,252,687 B1 | 6/2001 | Ishikawa et al. | |
| 6,252,688 B1 | 6/2001 | Ishikawa et al. | |
| 6,275,314 B1 | 8/2001 | Ishikawa et al. | |
| 6,384,943 B2 | 5/2002 | Ishikawa et al. | |
| 6,417,945 B2 | 7/2002 | Ishikawa et al. | |
| 6,912,362 B1 * | 6/2005 | Takiguchi et al. | 398/158 |
| 7,031,613 B1 * | 4/2006 | Mazzini et al. | 398/147 |
| 2003/0174981 A1 * | 9/2003 | DiGiovanni et al. | 385/123 |
| 2003/0185568 A1 * | 10/2003 | Ooi et al. | 398/81 |

FOREIGN PATENT DOCUMENTS

| | | |
|---|---|---|
| JP | 7-107069 | 4/1995 |
| JP | 2003-298516 | 10/2003 |

* cited by examiner

*Primary Examiner*—Leslie Pascal
(74) *Attorney, Agent, or Firm*—Staas & Halsey LLP (57) ABSTRACT

In the WDM optical transmission system, a high-slope dispersion compensator compensates wavelength dispersion produced in the optical transmission line. The high-slope dispersion compensator has a dispersion slope characteristic, by which a dispersion slope is substantially compensated over the wavelength bandwidth of the optical transmission line, and also a dispersion compensation characteristic, by which the residual dispersion produced after compensating the dispersion slope using the above dispersion slope characteristic becomes symmetrical with respect to a wavelength in the vicinity of the center of the wavelength bandwidth. To achieve the above compensation, a wavelength-multiplexed signal is divided into wavelength bandwidth groups, and the residual dispersion of the optical transmission line is compensated on a group-by-group basis for the wavelength bandwidth groups.

10 Claims, 11 Drawing Sheets

WAVELENGTH DIVISION MULTIPLEXING OPTICAL TRANSMISSION SYSTEM AND WAVELENGTH DISPERSION COMPENSATION UNIT

FIELD OF THE INVENTION

The present invention relates to a wavelength division multiplexing optical transmission system transmitting a wavelength division multiplexed signal from a transmitting side to a receiving side through an optical transmission line, and more particularly, in case that wavelength dispersion of the optical transmission line in the wavelength division multiplexing optical transmission system is compensated by a high-slope dispersion compensation unit having a dispersion slope capable of substantially compensating a wavelength dispersion slope in a wavelength bandwidth of the optical transmission line, and also having a dispersion compensation characteristic obtained by the aforementioned dispersion slope, such that residual dispersion after compensating the wavelength dispersion slope becomes substantially symmetrical with respect to a wavelength in the vicinity of the center of the wavelength bandwidth, a wavelength dispersion compensation unit for compensating the aforementioned residual dispersion.

BACKGROUND OF THE INVENTION

With an increased speed and capacity of communication, introduction of ultra high-speed wavelength division multiplexing (WDM) optical transmission systems with the communication speed of 10 Gbps, or even exceeding 40 Gbps, is in progress. In such high-speed optical transmission systems, an optical transmission signal waveform in an optical fiber transmission line is deteriorated by a wavelength dispersion characteristic of the transmission line, causing deterioration of the transmission quality. Accordingly, compensation of the wavelength dispersion is required.

As a means for compensating the wavelength dispersion in the optical fiber transmission line, a dispersion compensation fiber (DCF) has been known.

Figure 1:
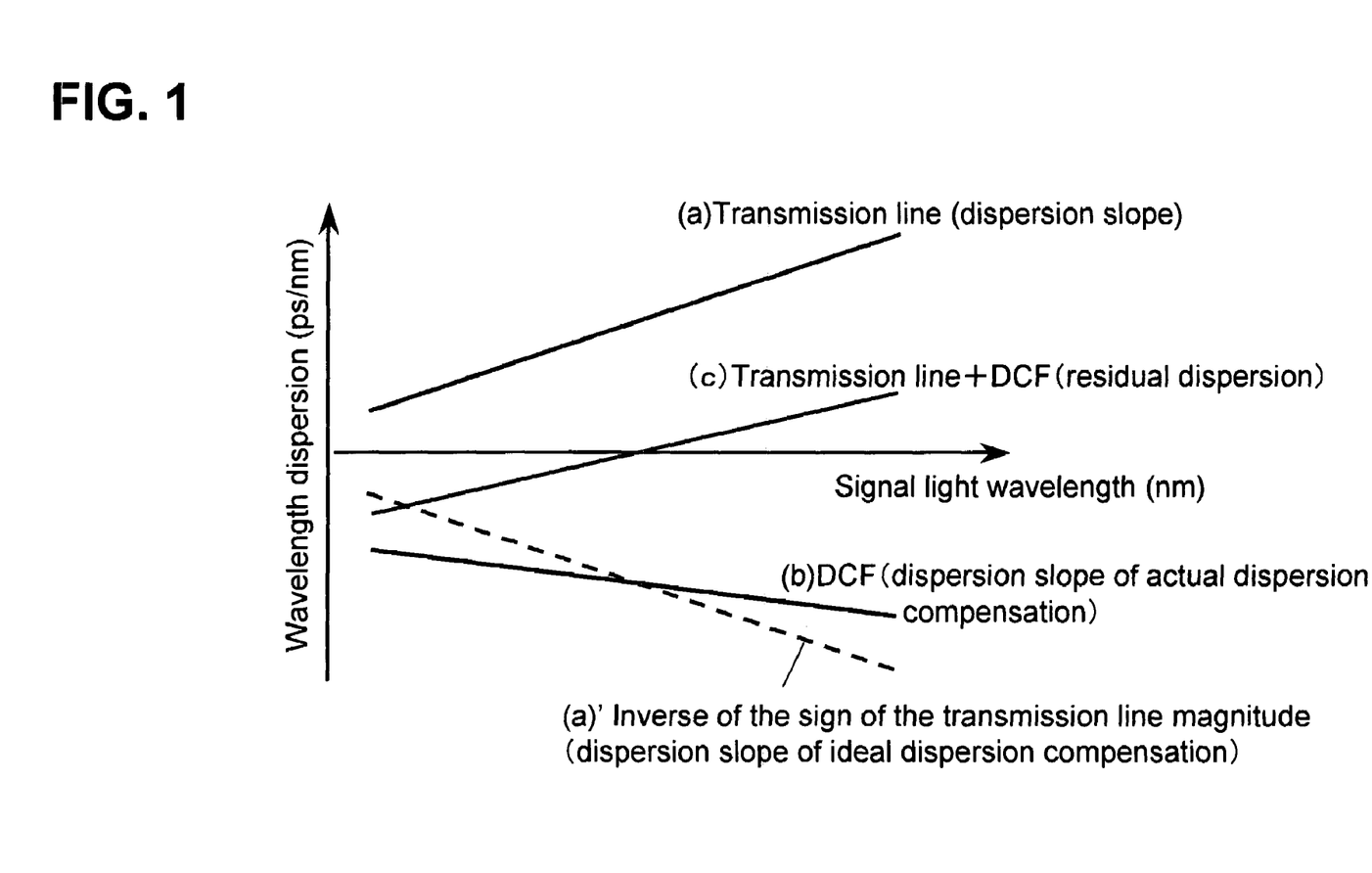
FIG. 1 shows a diagram illustrating the relation between the wavelength dispersion characteristic of an optical fiber transmission line and wavelength dispersion compensation using the DCF conventionally used.

FIG. 1 shows a diagram illustrating the relation between the wavelength dispersion characteristic of an optical fiber transmission line and the wavelength dispersion compensation using the DCF conventionally in use. The vertical axis shows the wavelength dispersion magnitude, while the horizontal axis shows the wavelength of the signal light. The dispersion value (a) of the optical transmission line has a positive value that increases substantially linearly with the increase of the wavelength, and also a positive dispersion gradient (dispersion slope). Therefore, if the wavelength dispersion is compensated by the dispersion value (a') having an ideal slope being symmetrical to the dispersion value (a) referenced from the wavelength dispersion of 0 ps/nm, the wavelength dispersion will be compensated completely. The DCF having been in use conventionally has the dispersion value (b) and the slope of which sign is inverted (minus) from the dispersion value and the gradient (slope) of the optical fiber transmission line. However, the slope is smaller than the ideal slope of the dispersion value (a'). Accordingly, when using the conventional DCF, it is not completely possible to compensate the wavelength dispersion produced in the optical fiber transmission line. Namely, even if the wavelength dispersion of the optical fiber transmission line is compensated by the DCF, the difference (c) caused by the residual dispersion wavelengths is produced.

Figure 2:
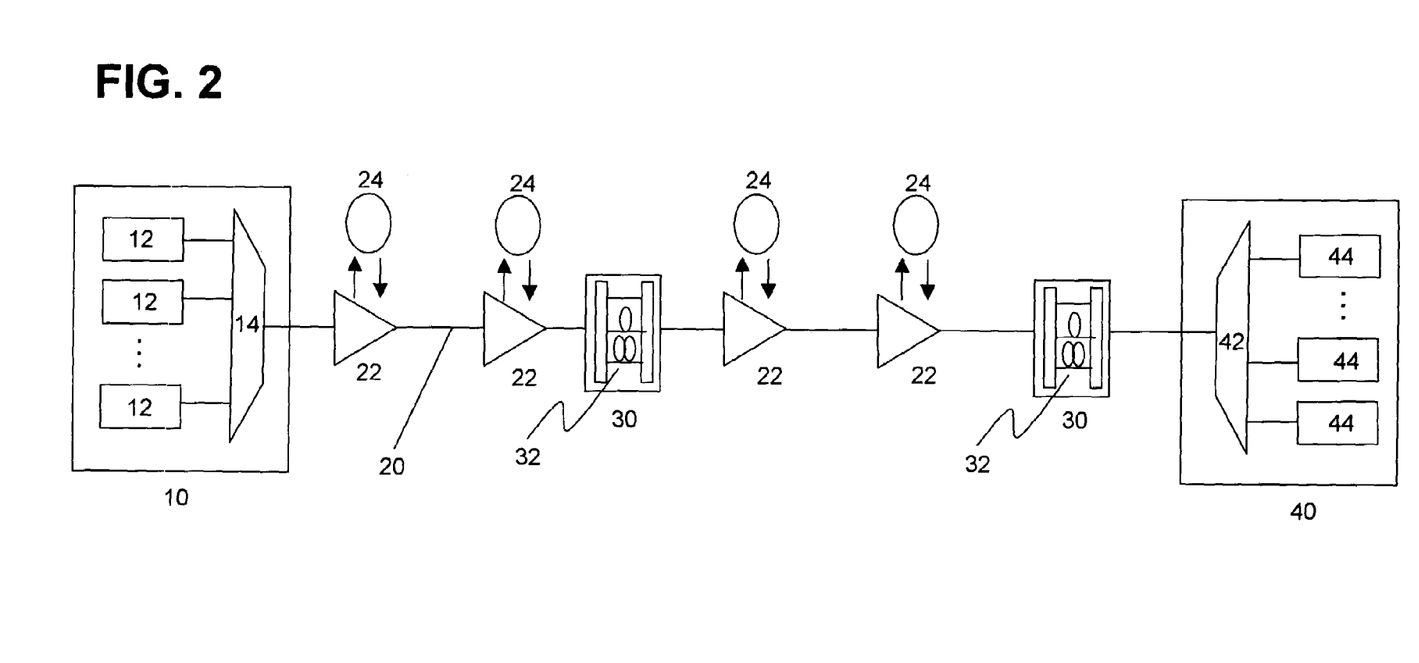
FIG. 2 shows a schematic configuration diagram of a wavelength division multiplexing optical transmission system.

FIG. 2 shows a schematic configuration diagram of the wavelength division multiplexing optical transmission system. As shown in this FIG. 2, in a transmission unit 10, a plurality of optical signals each having different wavelength fed from a plurality of optical transmitters 12 are multiplexed by a multiplexer 14, which are further amplified by a non-illustrated optical amplifier and output to an optical fiber transmission line 20 as wavelength multiplexed signals. In the middle of optical fiber transmission line 20, optical repeaters 22 are disposed at predetermined distance intervals, and the attenuated wavelength-multiplexed signal are amplified without being converted from the optical signal. Further, in each optical repeater 22, a dispersion compensation fiber (DCF) 24 having the wavelength dispersion compensation characteristic shown in FIG. 1 is inserted, by which the wavelength dispersion produced in optical fiber transmission line 20 of each predetermined distance interval is compensated collectively over the whole wavelength bandwidth of the wavelength-multiplexed signal.

However, as described earlier, residual dispersion is produced even after the dispersion is compensated using DCF 24. When the optical fiber transmission line has a long distance, undesirably the dispersion exceeds a tolerable dispersion value because of the accumulated residual dispersion. To cope with this problem, in the middle points of optical fiber transmission line 20, compensation nodes 30 are provided at intervals of, for example, a few hundred kilometers, for the purpose of compensating the accumulated residual dispersion. More specifically, each compensation node 30 includes a wavelength dispersion compensation unit 32 for compensating the accumulated residual dispersion, and further wavelength dispersion compensation unit 32 includes a DCF. Wavelength dispersion compensation unit 32 in compensation node 30 compensates the wavelength dispersion, which is accumulated while the wavelength-multiplexed signal is transmitted through optical fiber transmission line 20. Compensation nodes 30 are implemented at necessary intervals, so that the residual dispersion value produced after the above compensation may not exceed a tolerable dispersion value (dispersion tolerance). Thus, after relayed by compensation nodes 30, the wavelength-multiplexed signal reaches a reception unit 40. A demultiplexer 42 in reception unit 40 demultiplexes the signal into optical signals of each wavelength. Then receivers 44 receive the demultiplexed optical signals of each wavelength under tolerable wavelength dispersion conditions.

Now, as shown in FIG. 1, since the wavelength dispersion magnitude differs for each wavelength, when compensating an input wavelength-multiplexed signal collectively by the DCF provided in wavelength dispersion compensation unit 32, if the wavelength dispersion compensation is performed to meet the wavelength dispersion magnitude on the short wavelength region, the compensation magnitude in the long wavelength bandwidth becomes insufficient, and the wavelength dispersion exceeds the dispersion tolerance. On the other hand, if the wavelength dispersion compensation is performed to meet the wavelength dispersion magnitude on the long wavelength region, the compensation magnitude in the short wavelength bandwidth becomes excessively large, which undesirably exceeds the tolerable dispersion value on the inverse sign side.

Accordingly, in wavelength dispersion compensation unit 32, using DCFs corresponding to the compensation magnitude required for each channel signal of different wavelength after wavelength-dividing the wavelength-multiplexed signal, it is necessary to adjust the residual dispersion magnitude of each channel signal to the vicinity of 0 ps/nm, and thereafter multiplex the signals again and forward the signal to the optical fiber transmission line.

However, to apply different DCFs for each wavelength makes the configuration of wavelength dispersion compensation unit 32 complicate, which produces an increased cost. Therefore, to cope with this problem, there is a known method of wavelength grouping, in which the wavelength bandwidths of the wavelength-multiplexed signal are divided into a plurality of groups, and wavelength dispersion compensation is performed collectively on a group-by-group basis, for the groups that include a plurality of channel signals.

Figure 3A:
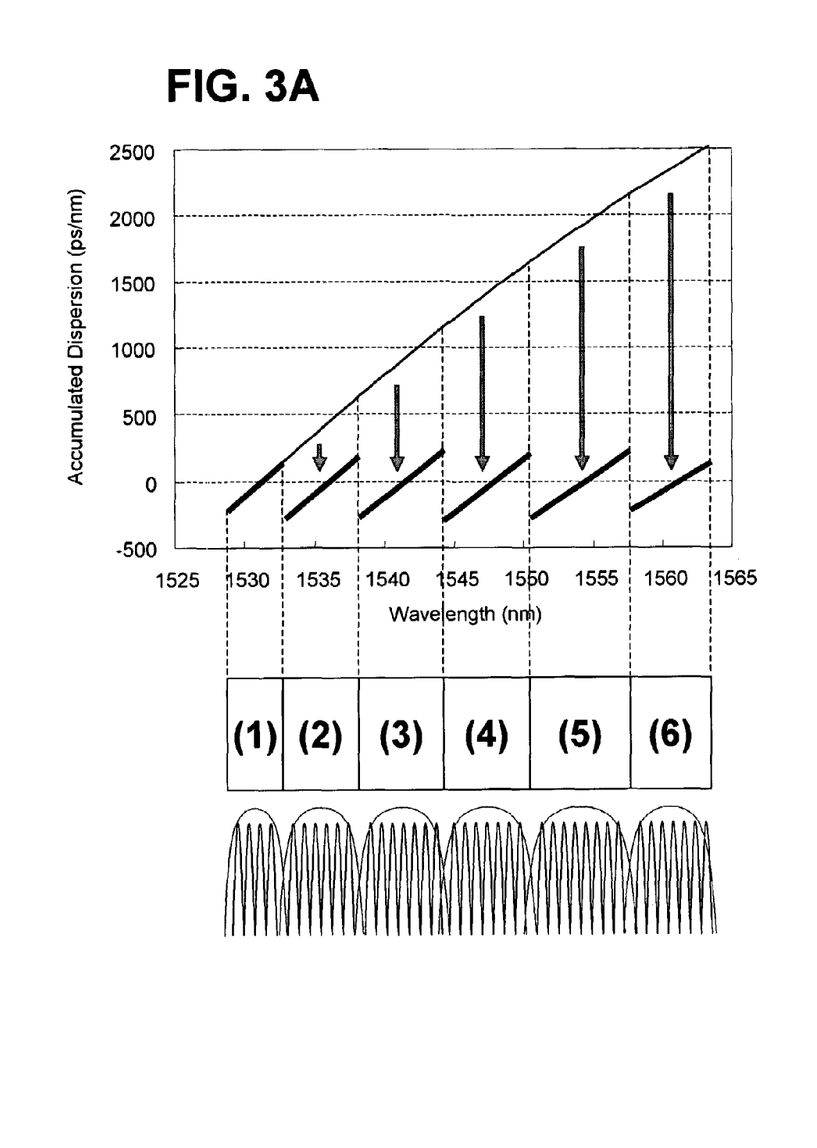
FIGS. 3A shows an example of wavelength dispersion compensation using a wavelength grouping method.
Figure 3B:
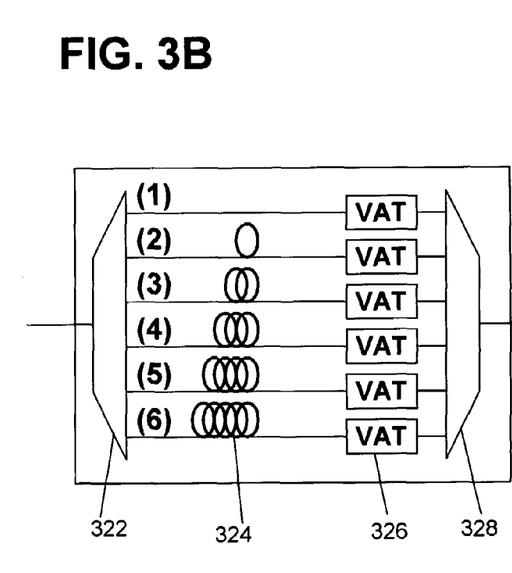
FIG. 3B shows a configuration example of wavelength dispersion compensation unit in case of applying the wavelength grouping method shown in FIG. 3A.

FIGS. 3A shows an example of wavelength dispersion compensation using the wavelength grouping method. As shown in this FIG. 3A, a wavelength-multiplexed signal is divided into six groups, and compensation magnitude is adjusted for each group so that the residual dispersion magnitude falls within a tolerable dispersion value. FIG. 3B shows a configuration example of wavelength dispersion compensation unit 32 when the wavelength grouping method corresponding to the example shown in FIG. 3A is applied. An input wavelength-multiplexed signal is demultiplexed into six groups by a demultiplexer 322. For the group (1) positioned on the shortest wavelength side, no wavelength dispersion compensation is performed by the DCF because the wavelength dispersion magnitude does not exceed the tolerable dispersion magnitude. For the groups (2) to (6) because a group having longer wavelength bandwidths produces larger wavelength dispersion magnitude, DCF 324 is applied for each group, so that larger compensation magnitude is acquired in accordance with the produced wavelength dispersion magnitude. Each channel signal is multiplexed again in multiplexer 328 via each variable optical attenuator (VAT) 326, and then forwarded as a wavelength-multiplexed signal. Here, each VAT 326 is provided for adjusting transmission loss differences between each wavelength bandwidth, in case of necessity.

PROBLEMS TO BE SOLVED BY THE INVENTION

Meanwhile, in recent years, improvement of the dispersion compensation fiber (DCF) has been achieved, and a high-slope DCF having a large dispersion slope compared to the conventional DCF (having a linear wavelength dispersion characteristic as shown in FIG. 1) has been developed.

Figure 4:
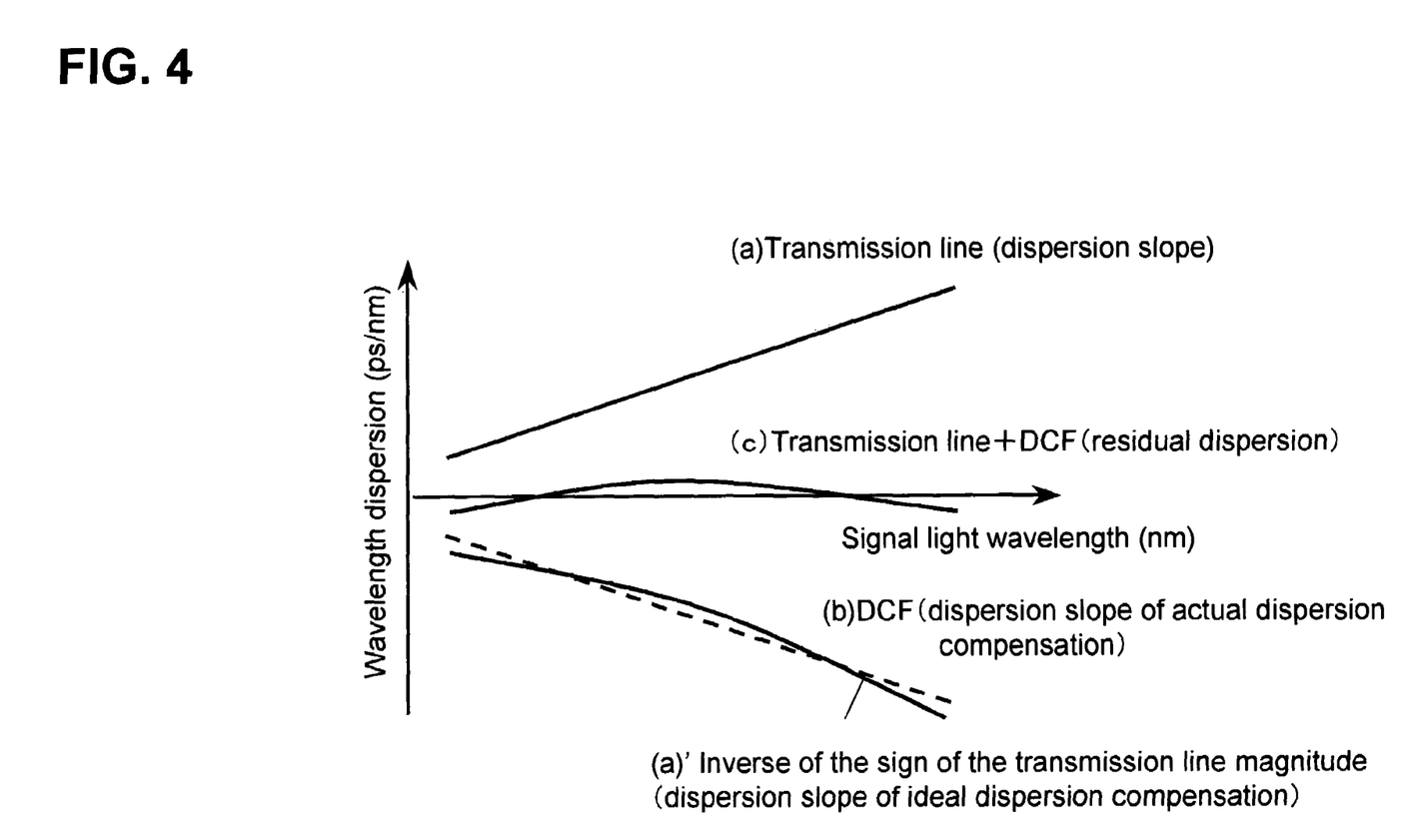
FIG. 4 shows a diagram illustrating a wavelength dispersion compensation characteristic of a high-slope DCF.

FIG. 4 shows a diagram illustrating the wavelength dispersion compensation characteristic of the high-slope DCF. Similar to FIG. 1, the vertical axis shows the wavelength dispersion magnitude, while the horizontal axis shows the wavelength. In this figure, the dispersion value (a) having the slope of the optical fiber transmission line is shown, as well as the dispersion value (a') having an ideal slope for completely compensating the above dispersion value. The actual dispersion value (b) of the high-slope DCF, of which gradient (slope) is substantially the same as the ideal dispersion (a'), represents a dispersion characteristic having a convex arc shape. Namely, the high-slope DCF has the dispersion slope capable of substantially compensating the wavelength dispersion slope over the wavelength bandwidths of the optical transmission line. With this dispersion slope, the high-slope DCF has a dispersion compensation characteristic in which the residual dispersion after compensating the wavelength dispersion slope is substantially symmetrical with respect to a wavelength in the vicinity of the center of the wavelength bandwidth.

By compensating the wavelength dispersion of the optical fiber transmission line using this high-slope DCF, differences of the residual dispersion magnitude among the wavelengths become small. However, a residual dispersion characteristic (c) of convex arc shape still remains, which leads to deterioration of transmission quality when the residual dispersion magnitude exceeds the tolerable dispersion value even in this case. For example, when the wavelength dispersion compensation is performed so as to meet the wavelength dispersion magnitude produced on both ends of the wavelength bandwidth of the wavelength-multiplexed signal, wavelength dispersion remains in the vicinity of the middle wavelength of the wavelength bandwidth. Meanwhile, when the wavelength dispersion compensation is performed so as to meet the wavelength dispersion magnitude produced in the vicinity of the center wavelength bandwidth of the wavelength-multiplexed signal, wavelength dispersion remains on both ends of the wavelength bandwidth. If the residual dispersion magnitude exceeds in any portion of the wavelength bandwidth, the transmission quality is deteriorated.

SUMMARY OF THE INVENTION

Accordingly, it is an object of the present invention to provide a wavelength division multiplexing optical transmission system and a wavelength dispersion compensation unit in the wavelength division multiplexing optical transmission system, by which efficient compensation of residual dispersion can be achieved when compensating the wavelength dispersion by use of a high-slope wavelength dispersion compensation unit, such as the above-mentioned high-slope dispersion compensation fiber (DCF).

In order to solve the aforementioned problem, according to the present invention, the wavelength division multiplexing optical transmission system transmitting a wavelength-multiplexed signal from the transmission side to the reception side through an optical transmission line compensates wavelength dispersion produced in the optical transmission line by use of a high-slope dispersion compensator. The high-slope dispersion compensator has a dispersion slope, by which the dispersion slope produced over the wavelength bandwidth of the optical transmission line can substantially be compensated, and a dispersion compensation characteristic such that the residual dispersion produced after compensating the dispersion slope by the dispersion slope characteristic becomes symmetrical with respect to the wavelength in the vicinity of the center of the wavelength bandwidth. The wavelength division multiplexing optical transmission system includes: a wavelength division section dividing the wavelength-multiplexed signal into a plurality of wavelength bandwidth groups; and a dispersion compensation section compensating the residual dispersion of the optical transmission line on a group-by-group basis for the wavelength bandwidth groups.

Further, in order to solve the aforementioned problem, the wavelength dispersion compensation unit according to the present invention compensates residual dispersion in case of compensating wavelength dispersion produced in the optical transmission line in a wavelength division multiplexing optical transmission system. The wavelength dispersion compensation is performed by a high-slope dispersion compensator having a dispersion slope, by which the dispersion slope produced over the wavelength bandwidth of the optical transmission line can substantially be compensated, and a dispersion compensation characteristic such that the residual dispersion produced after compensating the dispersion slope by the dispersion slope characteristic becomes symmetrical with respect to the wavelength in the vicinity of the center of the wavelength bandwidth. The wavelength dispersion compensation unit includes: a wavelength division section dividing the wavelength-multiplexed signal into a plurality of wavelength bandwidth groups; and a dispersion compensation section compensating the residual dispersion of the optical transmission line on a group-by-group basis for the wavelength bandwidth groups.

Preferably, the dispersion compensation section is either the above-mentioned high-slope dispersion compensator, or a variable dispersion compensator.

Further, preferably, the wavelength division section includes a three-port bandpass filter which divides the wavelength bandwidth of the wavelength-multiplexed signal into a medium bandwidth group of the wavelength bandwidth and an end bandwidth group including two bandwidths on the shorter wavelength side and the longer wavelength side than the medium bandwidth, and outputs signals of the respective bandwidth groups. Also, the dispersion compensation section collectively performs wavelength dispersion compensation on a group-by-group basis for the medium bandwidth group and the end bandwidth group each regarded as one wavelength bandwidth group.

Or, the wavelength division section may include a bandwidth division filter, which divides the wavelength bandwidth of the wavelength-multiplexed signal into a relatively shorter wavelength bandwidth and a relatively longer wavelength bandwidth, and outputs signals of the respective wavelength bandwidths. Also, the dispersion compensation section may collectively perform the wavelength dispersion compensation on a group-by-group basis, for the shorter wavelength bandwidth and the longer wavelength bandwidth each regarded as one wavelength bandwidth group.

Thus, when compensating the wavelength dispersion in an optical transmission line of an wavelength division multiplexing optical transmission system using a high-slope dispersion compensation unit such as a high-slope DCF, it becomes possible to compensate residual dispersion efficiently with a simple configuration by grouping the wavelength bandwidth into a plurality of groups, and by compensating the residual dispersion for each group.

In particular, from the dispersion compensation characteristic of the high-slope dispersion compensation unit, the wavelength dispersion magnitude of both end sides of the wavelength bandwidth becomes the same order. By using a three-port bandpass filter enabling collective extraction of both end sides of the wavelength bandwidth, it becomes possible to perform the dispersion compensation based on the demultiplexing with the number of groups less than the number of wavelength bandwidth groups, and thus dispersion compensation can be attained more efficiently at reduced cost.

Further scopes and features of the present invention will become more apparent by the following description of the embodiments with the accompanied drawings.

DETAILED DESCRIPTION OF THE PREFERRED EMBODIMENTS

The preferred embodiment of the present invention is described herein after referring to the charts and drawings. However, it is noted that the scope of the present invention is not limited to the embodiments described below.

The following describes, in the wavelength division multiplexing optical transmission system shown in FIG. 2 according to the embodiments of the present invention, a wavelength dispersion compensation unit 32 for compensating accumulated residual dispersion, when the aforementioned high-slope dispersion compensation fiber (DCF) is employed for dispersion compensation to be performed in each optical repeater 22. Wavelength dispersion compensation unit 32 in the embodiment of the present invention divides the wavelength bandwidth of a wavelength-multiplexed signal into a plurality of groups, and collectively compensates the residual dispersion of a plurality of channel signals included in each group.

Figure 5:
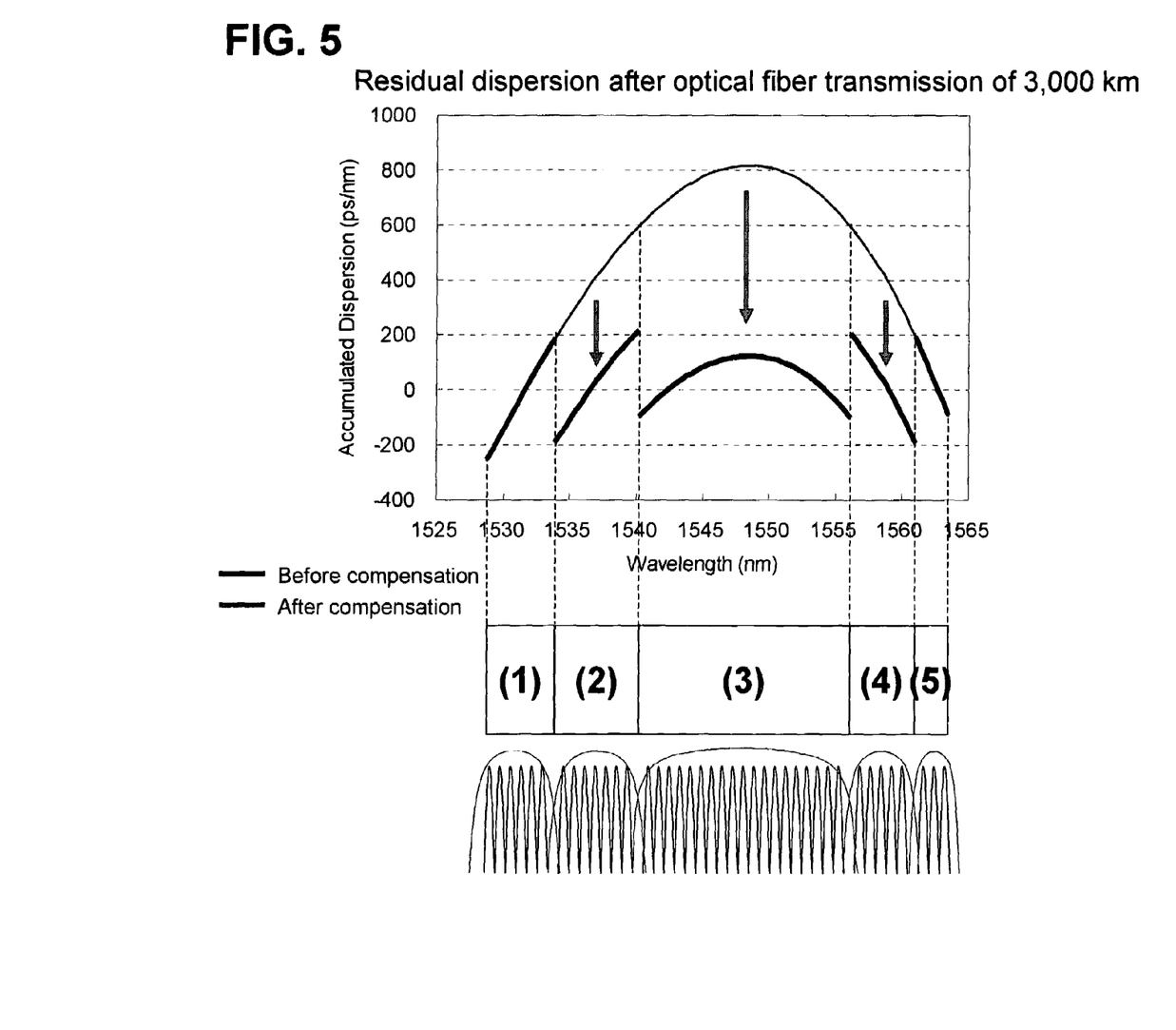
FIG. 5 shows a diagram illustrating an example of compensation on a group-by-group basis after grouping residual dispersion resulting from wavelength dispersion compensation by a high-slope DCF into a plurality of wavelength bandwidths.

FIG. 5 shows a diagram illustrating an example of compensation on a group-by-group basis after grouping residual dispersion resulting from wavelength dispersion compensation by a high-slope DCF into a plurality of wavelength bandwidths. As shown in FIG. 5, the wavelength-multiplexed signal having the residual dispersion of a convex arc shape is divided into five groups ((1), (2), (3), (4) and (5)), and compensation magnitude is adjusted so that the residual dispersion magnitude is satisfied within a tolerable dispersion value (for example, ±200 ps/nm).

As is apparent from FIG. 5, in case wavelength dispersion compensation is performed by the high-slope DCF, the wavelength dispersion magnitude has a wavelength dispersion compensation characteristic such that the wavelength dispersion magnitude becomes symmetrical with respect to the wavelength in the vicinity of the center of the wavelength bandwidth (center wavelength) of the wavelength-multiplexed signal. Corresponding to the difference of wavelength from the center wavelength, the wavelength dispersion magnitude on the shorter wavelength side is substantially equivalent to the wavelength dispersion magnitude on the longer wavelength side. Namely, in FIG. 5, the wavelength dispersion magnitude in the bandwidth (1) is substantially equivalent to the wavelength dispersion magnitude in the bandwidth (5), and also the wavelength dispersion magnitude in the bandwidth (2) is substantially equivalent to the wavelength dispersion magnitude in the bandwidth (4).

Figure 6A:
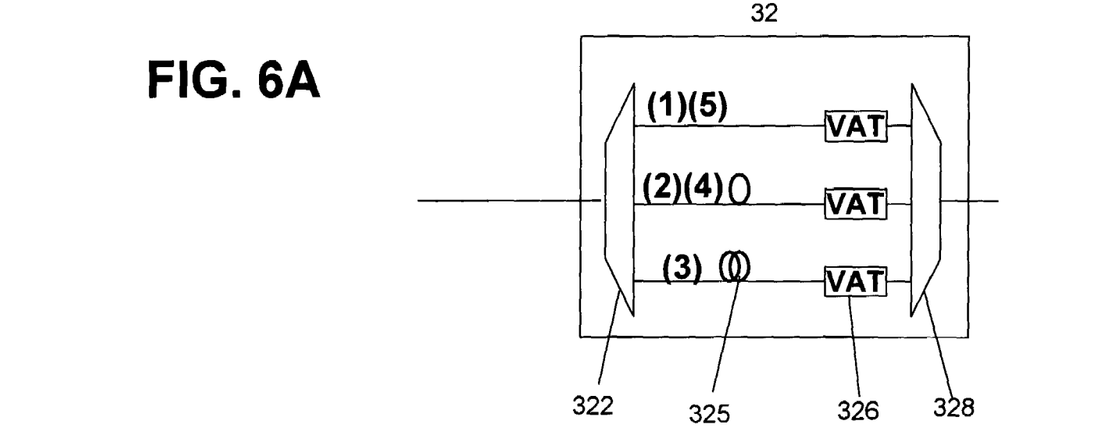
FIG. 6A shows an overall configuration example of a first exemplary configuration of a wavelength dispersion compensation unit according to an embodiment of the present invention.
Figure 6B:
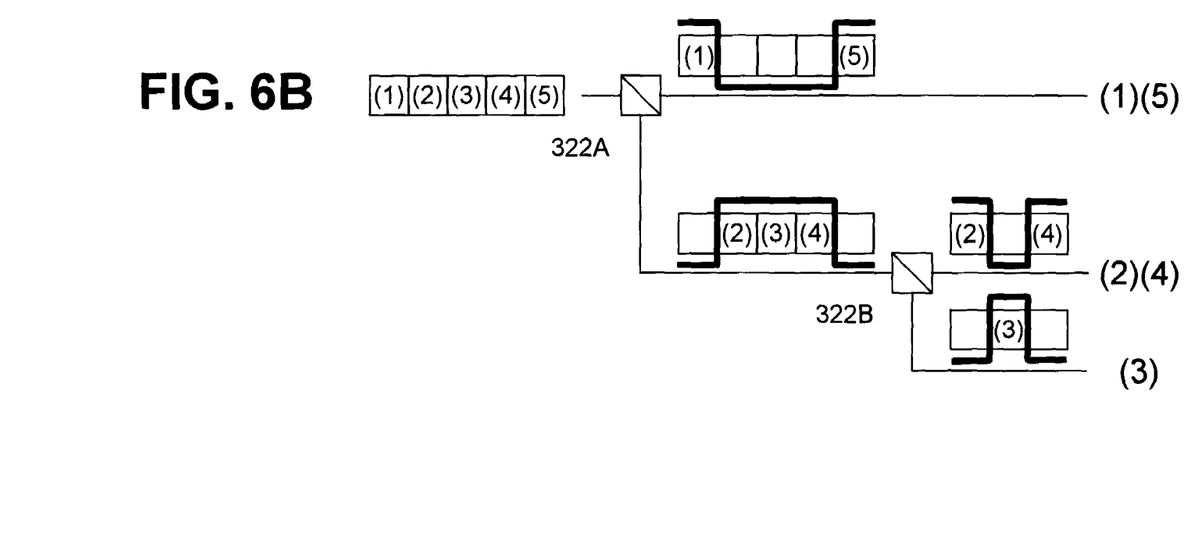
FIG. 6B shows a diagram illustrating the configuration of a demultiplexer, and the demultiplexing (filtering) function thereof.

FIGS. 6A, 6B show a first exemplary configuration of the wavelength dispersion compensation unit according to the embodiment of the present invention. FIG. 6A shows an overall configuration example of the first exemplary configuration of the wavelength dispersion compensation unit 32, which includes demultiplexer 322, high-slope DCF 325, variable optical attenuator 326, and multiplexer 328. FIG. 6B shows a diagram illustrating the configuration of demultiplexer 322, and the demultiplexing (filtering) function thereof. According to the embodiment of the present invention, demultiplexer 322 provided in the wavelength dispersion compensation unit includes three-port bandpass filters (322A, 322B) in consideration of the wavelength dispersion compensation characteristic of the high-slope DCF.

Here, the three-port bandpass filter has a function of separating a predetermined bandwidth located in the middle of a certain bandwidth from the bandwidths on the both ends, and outputting the respective band width signals, differently from an ordinary bandpass filter which passes only a predetermined medium bandwidth and cuts off bandwidths on both ends. As such a three-port bandpass filter, for example, WDM-15 (commodity name) from Santec Corporation is known.

More specifically, in three-port bandpass filter 322A, when a wavelength-multiplexed signal of the grouped wavelength bandwidths (1), (2), (3), (4) and (5) is input, the wavelength-multiplexed signal of the medium bandwidths (2), (3) and (4) is separated from the wavelength-multiplexed signal of the both end bandwidths (1) and (5), and these two wavelength-multiplexed signals are output respectively. Further, in the three-port bandpass filter 322B, the wavelength-multiplexed signal of the bandwidths (2), (3) and (4) having been separated by the three-port bandpass filter 322A is input, which is further separated into the wavelength-multiplexed signal of the medium bandwidth (3) in this bandwidth concerned and the wavelength-multiplexed signal of the both end bandwidths (2) and (4), and the wavelength-multiplexed signals are output respectively. As a result, the wavelength-multiplexed signal of the wavelength bandwidths (1), (2), (3), (4) and (5) is separated into the signals of the bandwidths (1) and (5), the bandwidths (2) and (4), and the bandwidth (3).

As described above, the wavelength dispersion magnitude in the bandwidth (1) and the wavelength dispersion magnitude in the bandwidth (5) are substantially equivalent, and also the wavelength dispersion magnitude in the bandwidth (2) and the wavelength dispersion magnitude in the bandwidth (4) are substantially equivalent. Or, oppositely, it is preferable that the both end bandwidths be grouped in such a way that the wavelength dispersion magnitude in each group becomes equivalent. The wavelength dispersion magnitude in each bandwidth (1), (5) is satisfied substantially within the tolerable dispersion magnitude. The wavelength dispersion magnitude in each bandwidth (2), (4) exceeds the tolerable dispersion magnitude, while this wavelength dispersion magnitude is smaller than that of the bandwidth (3).

According to the embodiment of the present invention, by use of the high-slope DCF for wavelength dispersion compensation, and further by demultiplexing the wavelength-multiplexed signal using the three-port bandpass filters, it becomes possible to extract altogether the discrete bandwidths on the shorter wavelength side and the longer wavelength side, respectively having substantially equivalent wavelength dispersion magnitude. Further, by collectively performing wavelength dispersion compensation after grouping signals of these extracted discrete two bandwidths into one group, it becomes possible to lessen the number of groups for the wavelength dispersion compensation (the number of wavelength dispersion compensation groups), as compared to the number of groups for the plurality of wavelength bandwidths (the number of wavelength bandwidth groups). This enables a simplified configuration of the wavelength dispersion compensation unit, which leads to efficient management of the wavelength dispersion compensation unit, and also cost reduction. In the examples shown in FIGS. 5A and 6A, the number of wavelength dispersion compensation groups is reduced to three (i.e. the group of bandwidths (1) and (5), the group of bandwidths (2) and (4), and the group of bandwidth (3)), whereas the number of wavelength bandwidth groups is five (i.e. each wavelength bandwidth (1), (2), (3), (4), (5) constitutes each group).

Here, the number of wavelength bandwidth groups is not necessarily limited to five, and either less groups or more groups than five is allowed. For example, in case that the number of wavelength bandwidth groups is three, these groups can be divided into two wavelength dispersion compensation groups by use of a single three-port bandpass filter. Also, in case that the number of wavelength bandwidth groups is nine, these groups can be divided into five wavelength dispersion compensation groups by use of four three-port bandpass filters combined. As is apparent from the above, the more the number of wavelength bandwidth groups is, the more the difference between the number of wavelength bandwidth groups and the number of wavelength dispersion compensation groups becomes. As the number of wavelength bandwidth groups increases, greater effects in terms of management efficiency and cost reduction can be obtained.

Figure 7A:
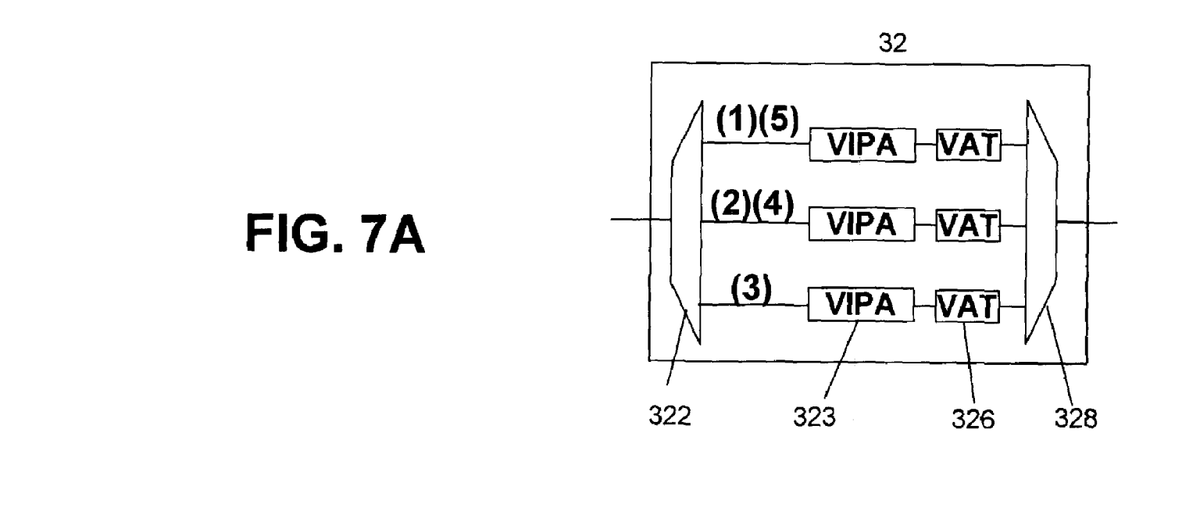
FIGS. 7A, 7B show a second exemplary configuration of a wavelength dispersion compensation unit according to an embodiment of the present invention.
Figure 7B:
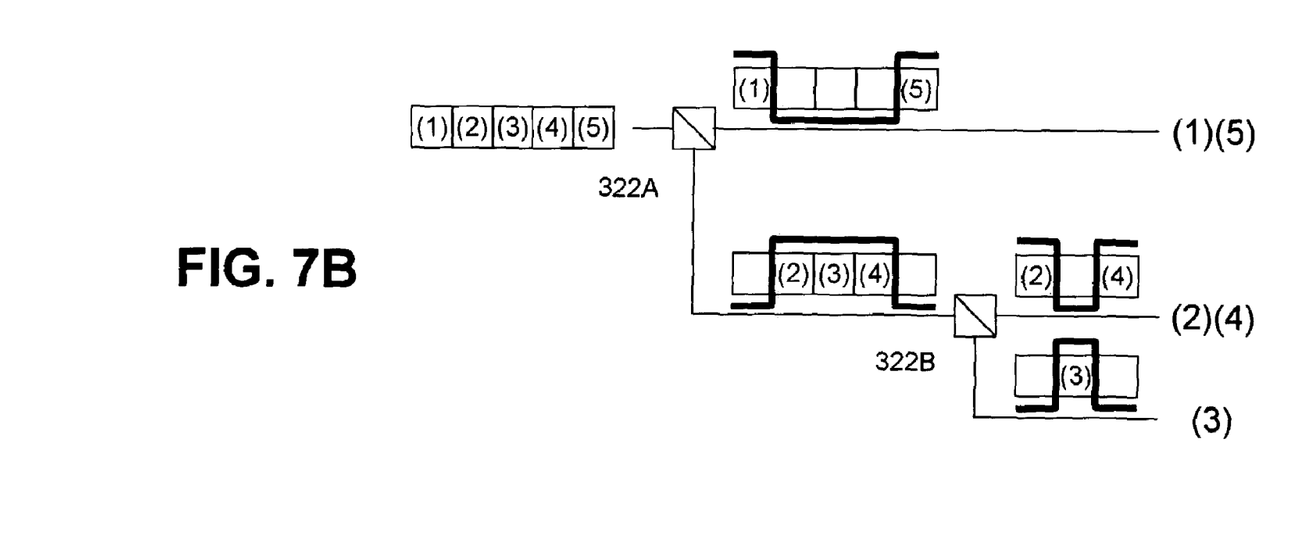

FIG. 7A, 7B show a second exemplary configuration of the wavelength dispersion compensation unit according to the embodiment of the present invention. FIG. 7A shows an overall configuration example the second exemplary configuration of the wavelength dispersion compensation unit 32, corresponding to the wavelength dispersion compensation unit shown in FIG. 6A. In this second configuration example, a VIPA (virtual imaged phased array) variable dispersion compensator 323 is employed, in place of high-slope DCF 325 in the first configuration. Other configuration portions are similar to those applied in the first configuration.

Figure 8:
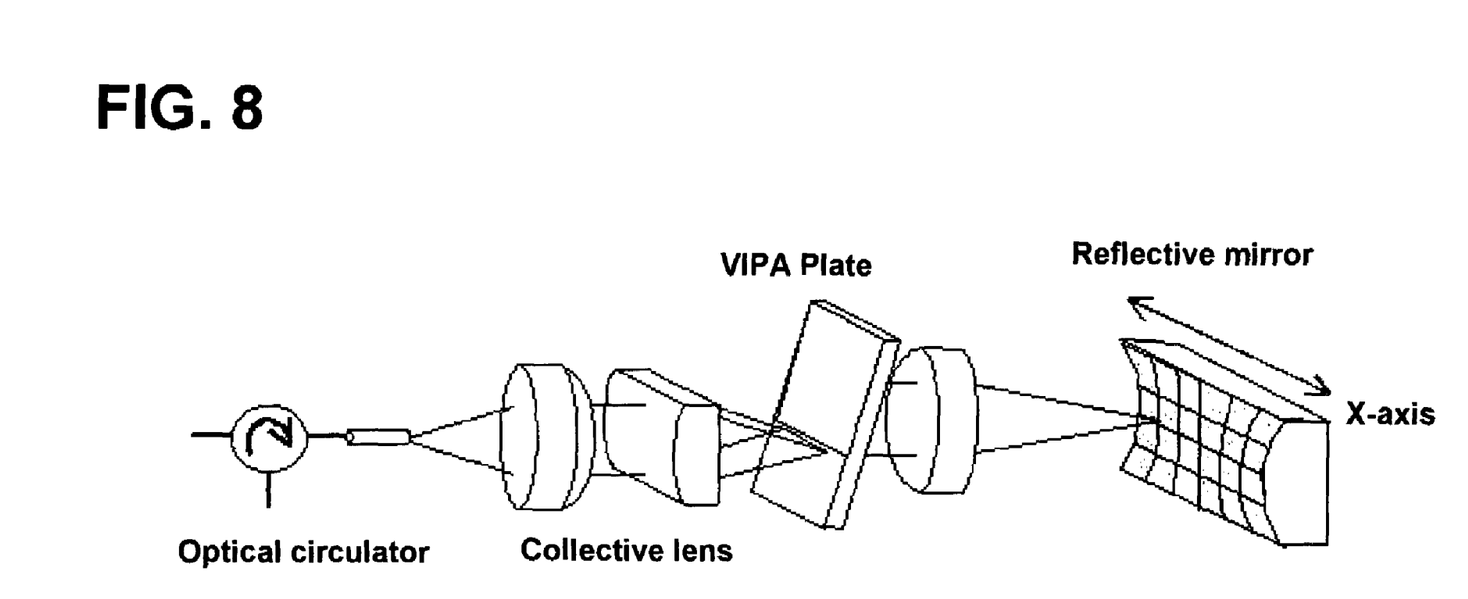
FIG. 8 shows a principle configuration diagram of a VIPA variable dispersion compensator 323.

FIG. 8 shows a principle configuration diagram of VIPA variable dispersion compensator 323. The VIPA variable dispersion compensator includes a wavelength dispersion element (VIPA plate) 3231 having a thin plate coated with a reflective film on both faces, and a reflective mirror 3232. By moving reflective mirror 3232 along the x-axis direction, the dispersion compensation magnitude can be varied continuously, ranging from −800 ps/nm to 800 ps/nm.

As a wavelength dispersion compensation means for the signal in each wavelength dispersion compensation group classified to the number less than the number of wavelength bandwidth group, it is also possible to compensate for necessary magnitude using a variable dispersion compensator, in place of high-slope DCF 325 having fixed dispersion compensation magnitude per unit length. By the use of the variable dispersion compensator, variation of the dispersion magnitude caused by scattered dispersion compensation magnitude in the DCF or temperature variation of the transmission line can be absorbed, which enables more accurate and flexible compensation.

The variable dispersion compensator is not limited to the VIPA variable dispersion compensator. Any variable dispersion compensators using other methods are also applicable.

Figure 9A:
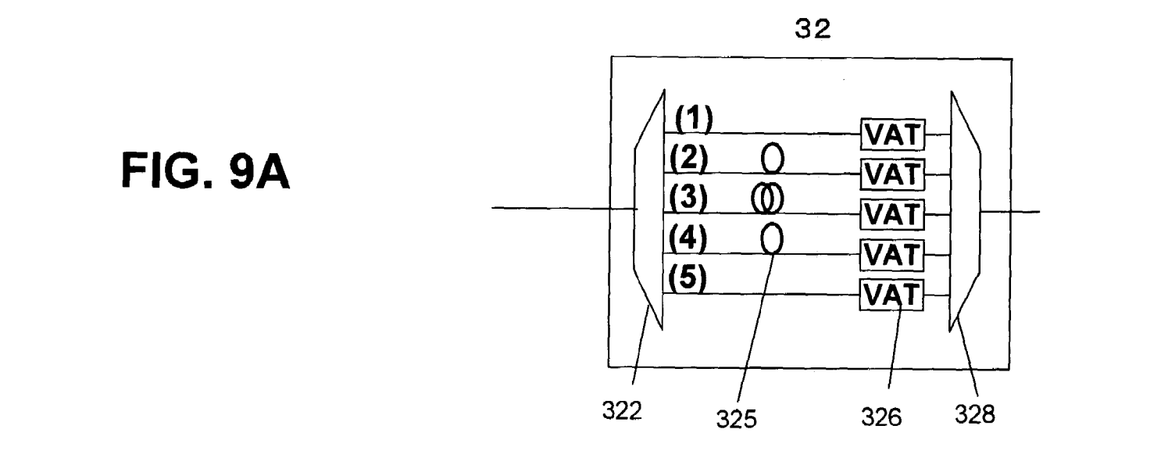
FIG. 9A shows an overall configuration example of a third exemplary configuration of a wavelength dispersion compensation unit according to an embodiment of the present invention.
Figure 9B:
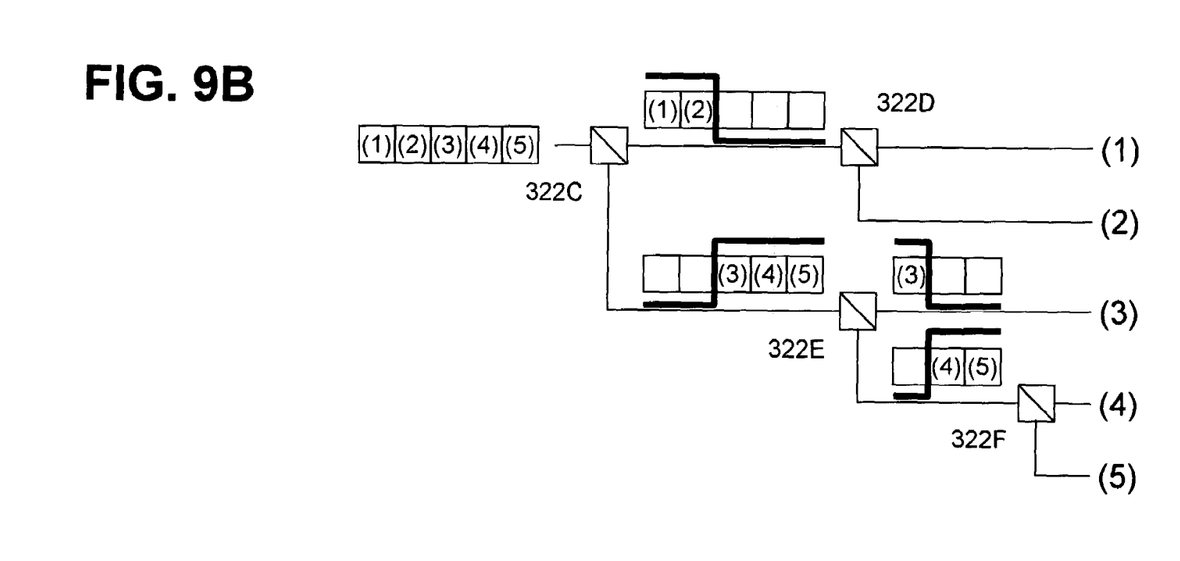
FIG. 9B shows a diagram illustrating the configuration of a demultiplexer in case of using bandwidth division filters, and demultiplexing (filtering) function thereof.

FIGS. 9A, 9B show a third exemplary configuration of the wavelength dispersion compensation unit according to an embodiment of the present invention. FIG. 9A shows an overall configuration example of wavelength dispersion compensation unit 32, in which each wavelength bandwidth group (each wavelength bandwidth group (1), (2), (3), (4), (5)) are divided separately, differently from the first exemplary configuration shown in FIG. 6A. The wavelength dispersion compensation is performed independently for each wavelength bandwidth group. In this third exemplary configuration, as demultiplexer 322, bandwidth division filters by which the wavelength bandwidth is divided into two bandwidths, i.e. the short wavelength side and the long wavelength side, are employed, in place of the three-port bandpass filters employed in the above first exemplary configuration. FIG. 9B shows a diagram illustrating the configuration of demultiplexer 322 in case of using the bandwidth division filters, and a demultiplexing (filtering) function thereof. When demultiplexing the five wavelength bandwidth groups (wavelength bandwidth groups (1), (2), (3), (4), (5)) shown in FIG. 5 using demultiplexer 322 constituted of the bandwidth division filters (322C, 322D, 322E, 322F), firstly the five wavelength bandwidth groups are separated into bandwidth group (1), (2) and bandwidth group (3), (4), (5) by bandwidth division filter 322C. Bandwidth group (1), (2) are further divided into bandwidth group (1) and bandwidth group (2) by bandwidth division filter 322D. Also, bandwidth group (3), (4), (5) is separated into bandwidth group (3) and bandwidth group (4), (5) by bandwidth division filter 322E, and bandwidth group (4), (5) is further separated into bandwidth group (4) and bandwidth group (5) by bandwidth division filter 322F. Thereafter, as shown in FIG. 9A, the wavelength dispersion compensation is performed for each bandwidth group by the high-slope DCF, so as to obtain necessary compensation magnitude.

Figure 10A:
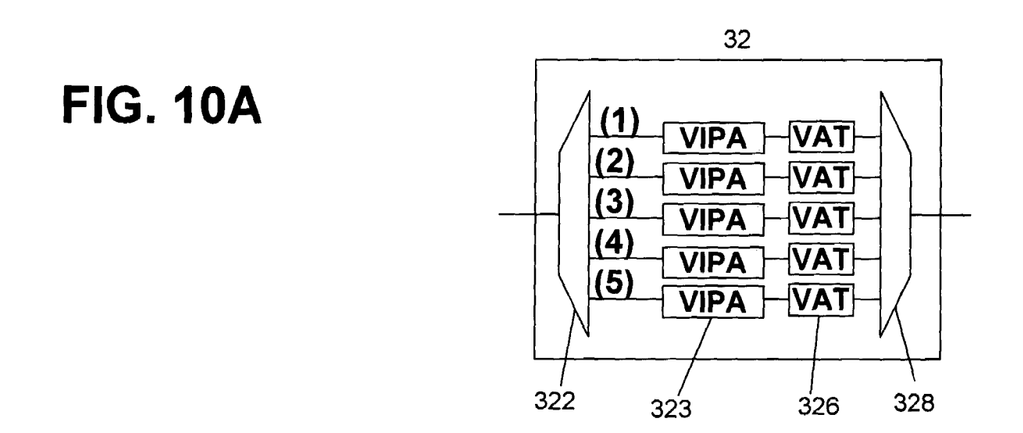
FIGS. 10A, 10B show a fourth exemplary configuration of a wavelength dispersion compensation unit according to an embodiment of the present invention.
Figure 10B:
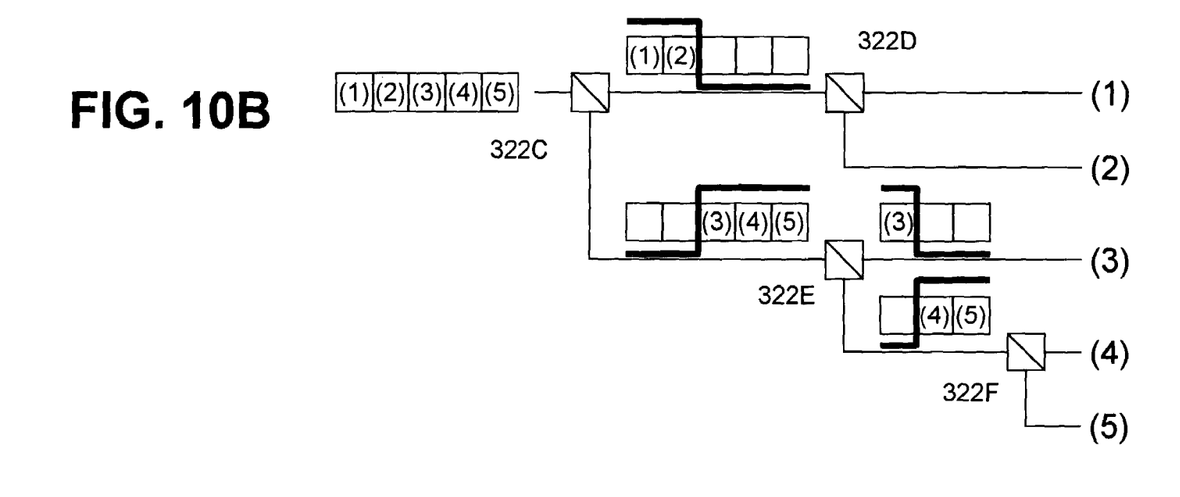

FIGS. 10A, 10B show a fourth exemplary configuration of the wavelength dispersion compensation unit according to the embodiment of the present invention. In this fourth exemplary configuration, VIPA variable dispersion compensator 323 is employed, in place of high-slope DCF 325 employed in the above third exemplary configuration. Other configuration portions are similar to those of the third exemplary configuration. Namely, each bandwidth group (1), (2), (3), (4), (5) is separated individually, and the wavelength dispersion compensation is performed for each bandwidth group by VIPA variable dispersion compensator 323 to obtain necessary compensation magnitude.

Figure 11:
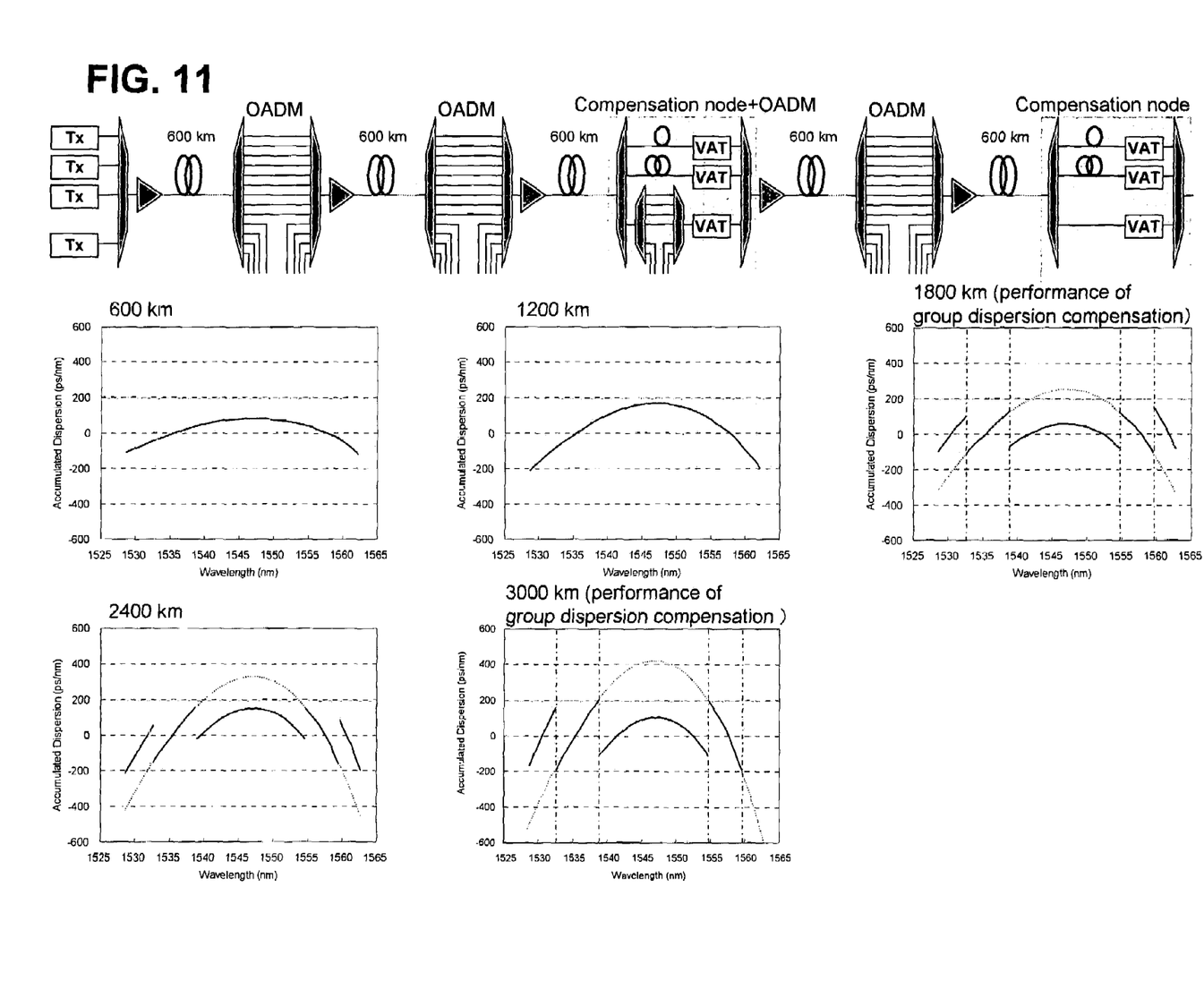
FIG. 11 shows a diagram illustrating an exemplary configuration of a wavelength division multiplexing optical transmission system, which includes compensation nodes each having the wavelength dispersion compensation unit of the first exemplary configuration according to the embodiment of the present invention, and OADMs (optical add drop modules), and also shows the wavelength dispersion magnitude in each OADM.

FIG. 11 shows a diagram illustrating an exemplary configuration of a wavelength division multiplexing optical transmission system, which includes compensation nodes each having the wavelength dispersion compensation unit of the first exemplary configuration according to the embodiment of the present invention, and OADMs (optical add drop modules). Also the wavelength dispersion magnitude in each OADM is shown in this FIG. 11. The OADM is a unit for dropping a portion of the wavelength-multiplexed signal, and for adding a new optical signal to the wavelength-multiplexed signal, in the middle of the optical fiber transmission line. In the configuration shown in FIG. 11, for example, each OADM is disposed at distance intervals of 600 km. In case the dispersion magnitude exceeds a predetermined tolerable value, a compensation node is provided. In FIG. 11, it is designed such that the group dispersion compensation is performed by each compensation node at the distance of 1,800 km and 3,000 km from the transmission point, and that the wavelength dispersion of each grouped wavelength bandwidth is satisfied within the tolerable dispersion magnitude.

The foregoing description of the embodiments is not intended to limit the invention to the particular details of the examples illustrated. Any suitable modification and equivalents may be resorted to the scope of the invention. All features and advantages of the invention which fall within the scope of the invention are covered by the appended claims.

What is claimed is:

1. A wavelength division multiplexing optical transmission system transmitting a wavelength-multiplexed signal through an optical transmission line, said wavelength division multiplexing optical transmission system comprising:
    a wavelength division section comprising:
        a first three-port bandpass filter dividing the wavelength-multiplexed signal into contiguous groups including a first medium bandwidth group of signals, a first shorter wavelength side end group of signals on a shorter wavelength side of the first medium bandwidth group of signals and a first longer wavelength side end group of signals on a longer wavelength side of the first medium bandwidth group of signals, and
        a second three-port bandpass filter dividing the first medium bandwidth group of signals into contiguous groups including a second medium bandwidth group of signals, a second shorter wavelength side end group of signals on a shorter wavelength side of the second medium bandwidth group of signals and a second longer wavelength side end group of signals on a longer wavelength side of the second medium bandwidth of signals; and
    a dispersion compensation section collectively performing dispersion compensation of at least one of
        the first shorter wavelength side end group of signals and the first longer wavelength side end group of signals taken together without the first medium bandwidth group of signals, and
        the second shorter wavelength side end group of signals and the second longer wavelength side end group of signals taken together without the first shorter wavelength side end group of signals, the first longer wavelengths side end group of signals and the second medium bandwidth group of signals,
    to thereby compensate residual dispersion of the optical transmission line.

2. The wavelength division multiplexing optical transmission system according to claim 1, wherein the dispersion compensation section comprises a dispersion compensator collectively performing dispersion compensation on one of:
    the first shorter wavelength side end group of signals and the first longer wavelength side end group of signals taken together without the first medium bandwidth group of signals, the second medium bandwidth group of signals taken together without the first shorter wavelength side end group of signals, the first longer wavelength side end group of signals, the second shorter wavelength side end group of signals and the second longer wavelength side end group of signals, and the second shorter wavelength side end group of signals and the second longer wavelength side end group of signals taken together without the first shorter wavelength side end group of signals, the first longer wavelengths side end group of signals and the second medium bandwidth group of signals.

3. The wavelength division multiplexing optical transmission system according to claim 1, wherein the dispersion compensation section comprises a VIPA (virtual imaged phased array) variable dispersion compensator collectively performing dispersion compensation on one of:

the first shorter wavelength side end group of signals and the first longer wavelength side end group of signals taken together without the first medium bandwidth group of signals, the second medium bandwidth group of signals taken together without the first shorter wavelength side end group of signals, the first longer wavelength side end group of signals, the second shorter wavelength side end group of signals and the second longer wavelength side end group of signals, and the second shorter wavelength side end group of signals and the second longer wavelength side end group of signals taken together without the first shorter wavelength side end group of signals, the first longer wavelengths side end group of signals and the second medium bandwidth group of signals.

4. A wavelength dispersion compensation unit comprising:
a wavelength division section comprising:
  a first three-port bandpass filter dividing a wavelength-multiplexed signal transmitted through an optical transmission line into contiguous groups including a first medium bandwidth group of signals, a first shorter wavelength side end group of signals on a shorter wavelength side of the first medium bandwidth group of signals and a first longer wavelength side end group of signals on a longer wavelength side of the first medium bandwidth group of signals, and
  a second three-port bandpass filter dividing the first medium bandwidth group of signals into contiguous groups including a second medium bandwidth group of signals, a second shorter wavelength side end group of signals on a shorter wavelength side of the second medium bandwidth group of signals and a second longer wavelength side end group of signals on a longer wavelength side of the second medium bandwidth of signals; and
a dispersion compensation section collectively performing dispersion compensation of at least one of:
  the first shorter wavelength side end group of signals and the first longer wavelength side end group of signals taken together without the first medium bandwidth group of signals, and
  the second shorter wavelength side end group of signals and the second longer wavelength side end group of signals taken together without the first shorter wavelength side end group of signals, the first longer wavelengths side end group of signals and the second medium bandwidth group of signals,
to thereby compensate residual dispersion of the optical transmission line.

5. The wavelength dispersion compensation unit according to claim 4, wherein the dispersion compensation section comprises a dispersion compensator collectively performing dispersion compensation on one of:

the first shorter wavelength side end group of signals and the first longer wavelength side end group of signals taken together without the first medium bandwidth group of signals, the second medium bandwidth group of signals taken together without the first shorter wavelength side end group of signals, the first longer wavelength side end group of signals, the second shorter wavelength side end group of signals and the second longer wavelength side end group of signals, and the second shorter wavelength side end group of signals and the second longer wavelength side end group of signals taken together without the first shorter wavelength side end group of signals, the first longer wavelengths side end group of signals and the second medium bandwidth group of signals.

6. The wavelength dispersion compensation unit according to claim 4, wherein the dispersion compensation section comprises a VIPA (virtual imaged phased array) variable dispersion compensator collectively performing dispersion compensation on one of:

the first shorter wavelength side end group of signals and the first longer wavelength side end group of signals taken together without the first medium bandwidth group of signals, the second medium bandwidth group of signals taken together without the first shorter wavelength side end group of signals, the first longer wavelength side end group of signals, the second shorter wavelength side end group of signals and the second longer wavelength side end group of signals, and the second shorter wavelength side end group of signals and the second longer wavelength side end group of signals taken together without the first shorter wavelength side end group of signals, the first longer wavelengths side end group of signals and the second medium bandwidth group of signals.

7. An apparatus comprising:
a first three-port bandpass filter dividing a wavelength-multiplexed signal transmitted through an optical transmission line into contiguous groups including a first medium bandwidth group of signals, a first shorter wavelength side end group of signals on a shorter wavelength side of the first medium bandwidth group of signals and a first longer wavelength side end group of signals on a longer wavelength side of the first medium bandwidth group of signals;
a second three-port bandpass filter dividing the first medium bandwidth group of signals into contiguous groups including a second medium bandwidth group of signals, a second shorter wavelength side end group of signals on a shorter wavelength side of the second medium bandwidth group of signals and a second longer wavelength side end group of signals on a longer wavelength side of the second medium bandwidth of signals; and
a dispersion compensation section collectively performing dispersion compensation of at least one of:
  the first shorter wavelength side end group of signals and the first longer wavelength side end group of signals taken together without the first medium bandwidth group of signals, and the second shorter wavelength side end group of signals and the second longer wavelength side end group of signals taken together without the first shorter wavelength side end group of signals, the first longer wavelengths side end group of signals and the second medium bandwidth group of signals.

8. An apparatus as in claim 7, wherein, to collectively perform dispersion compensation, the dispersion compensation section comprises:
   a virtual imaged phased array (VIPA) variable dispersion compensator.

9. An apparatus as in claim 7, wherein the dispersion compensation section comprises:
   a first dispersion compensator collectively compensating dispersion of the second medium bandwidth group of signals taken together without the first shorter wavelength side end group of signals, the first longer wavelength side end group of signals, the second shorter wavelength side end group of signals and the second longer wavelength side end group of signals, and
   a second dispersion compensator collectively compensating dispersion of the second shorter wavelength side end group of signals and the second longer wavelength side end group of signals taken together without the first shorter wavelength side end group of signals, the first longer wavelengths side end group of signals and the second medium bandwidth group of signals,
   wherein each of the first and second dispersion compensators is:
       a virtual imaged phased array (VIPA) variable dispersion compensator.

10. An apparatus comprising:
    a first three-port bandpass filter dividing a wavelength-multiplexed signal transmitted through an optical transmission line into contiguous groups including a first medium bandwidth group of signals, a first shorter wavelength side end group of signals on a shorter wavelength side of the first medium bandwidth group of signals and a first longer wavelength side end group of signals on a longer wavelength side of the first medium bandwidth group of signals,
    a second three-port bandpass filter dividing the first medium bandwidth group of signals into contiguous groups including a second medium bandwidth group of signals, a second shorter wavelength side end group of signals on a shorter wavelength side of the second medium bandwidth group of signals and a second longer wavelength side end group of signals on a longer wavelength side of the second medium bandwidth of signals; and
    means for collectively performing dispersion compensation of at least one of:
        the first shorter wavelength side end group of signals and the first longer wavelength side end group of signals taken together without the first medium bandwidth group of signals, and
        the second shorter wavelength side end group of signals and the second longer wavelength side end group of signals taken together without the first shorter wavelength side end group of signals, the first longer wavelengths side end group of signals and the second medium bandwidth group of signals.

\* \* \* \* \*